Patented July 25, 1939

2,166,963

UNITED STATES PATENT OFFICE 2,166,963

ANTIGENIC POLYSACCHARIDE COMPLEX

Peter Masucci, Norwood, Pa., assignor to Sharp & Dohme, Incorporated, Philadelphia, Pa., a corporation of Maryland No Drawing. Application November 19, 1936, Serial No. 111,610

5 Claims. (Cl. 167—78)

This invention relates to new active polysaccharides or polysaccharide complexes derived from cultures of cocci, particularly from autolyzed cultures of cocci, and to a new process for the production of such bodies. The new products are antigenic, that is, they possess the two properties of reacting with, and forming a precipitate with, their homologous antisera, and of stimulating the production of specific antibodies when injected into animals.

It has been frequently reported that certain bacterial cultures contain a substance, commonly termed "soluble specific substance", which reacts with its homologous antiserum to form a precipitate. For example, it is known that a fluid culture of Type I pneumococcus contains a substance which is a specific precipitant for Type I antipneumococcus serum even when the dilution of such substance is as high as 1:5,000,000.

Heidelberger and Avery have isolated a soluble specific substance from cultures of pneumococci by concentrating the cultures on a steam bath and extracting a soluble specific substance from the concentrated culture. The product which they so isolated was found to be a polysaccharide and to consist of polymers of glucose-glucuronic acid, some of which contained nitrogen and some of which did not contain nitrogen. Subsequent studies demonstrated that the polysaccharide so isolated when sufficiently pure possessed the characteristic properties of a hapten, that is, the property of reacting specifically in vitro with its homologous antisera to give a precipitate, but, when injected into animals, being incapable of stimulating the production of antibodies.

American investigators have widely accepted the theory that the specific soluble substances present in the bacterial cultures are dependent for the antigenic activity which they exhibit in the form in which they exist in these cultures on a combination or union with some other component of the bacterial cell, probably a protein. As the isolated polysaccharides of Heidelberger and Avery are without antigenic properties, the assumption has been made that the combination or union of the polysaccharide and protein present in the bacterial culture is disrupted in the course of the isolation, so that only the polysaccharide portion of the complex is isolated.

Avery and Goebel have shown that the pneumococcus polysaccharide of Heidelberger et al. is different from a polysaccharide present in the pneumococci or pneumococcus culture as isolated by them, in that it lacks an acetyl group apparently lost in the process of isolation, presumably because of the use of caustic. Avery and Goebel, using a process similar to that of Heidelberger et al., but avoiding the use of caustic, isolated a polysaccharide from a pneumococcus culture which was the same as that of Heidelberger et al. except that it was not de-acetylated during isolation. This acetylated product differed from the de-acetylated product in that it was considerably more active in forming a precipitate with its homologous antisera (as a hapten), and in that it had the power of inducing active immunity in mice, that is, the property of acting as an antigen.

In both the original Heidelberger and Avery process for the preparation of the de-acetylated polysaccharide and the later Avery and Goebel process for preparing the acetylated polysaccharide, autolyzed cultures of pneumococcus were used, and these cultures were concentrated to about $1/10$ to $1/15$ of the original volume by heating on a boiling water bath or in a steam kettle, and were then subjected to successive extractions and precipitations.

These polysaccharides isolated from pneumococcus cultures by these workers are readily soluble in water, and give clear solutions. The products are free from proteins, and lipoid complexes, and contain no phosphorus.

Other investigators have described the preparation of immunizing fractions from bacilli, such as the bacilli of the typhoid-paratyphoid group, by extracting the organisms with trichloracetic acid in the cold, dialyzing the extract until free from trichloracetic acid, and precipitating the resulting opalescent solution with alcohol or acetone. The product so obtained is a slightly yellowish powder, which, when brought into contact with water, first swells and then dissolves to yield an opalescent solution. The substances were found to stimulate the production of antibodies when injected into animals, and thus to be antigens. These workers indicate that the only substance present in the trichloracetic acid extract of the organisms capable of giving an opalescent solution is this immunizing fraction or "complete antigen", and that this opalescence is to be regarded as a practical test for the presence of the complete antigen.

This "complete antigen" was found to contain carbohydrate units, phosphorus, and fatty acids, and it was concluded that the substance consists essentially of a polysaccharide in combination with the lipoid.

The same workers (Boivin and Mesrobeanu) who so obtained the immunizing fraction or antigen from bacilli of the typhoid-paratyphoid group attempted to isolate a similar polysaccharide-lipoid complex from pneumococci, but were unsuccessful, as the trichloracetic acid extract from the organisms yielded only a free polysaccharide which did not have antigenic properties, although it did have the property of forming a precipitate with homologous antisera. These workers advanced the opinion that there was present in the pneumococci a polysaccharide-lipoid complex, but that this complex was of such liability as to make its isolation impossible.

As a result of my investigations, I have been able to prepare a polysaccharide complex from cultures of cocci in isolated, pure form which is actively antigenic, which is a specific precipitant for its homologous antisera, and which has the property of inducing the formation of antibodies when injected into animals, and causing active immunization of such animals. The isolated product, which is obtained in the form of a dry white powder, is difficultly wet with water, and when brought into contact with water, first swells and then disperses to form an opalescent, colloidal solution. References in this specification and the appended claims to a solution or solutions of such materials are to such opalescent, colloidal solutions, although the term "suspension" might also be used to describe them, in view of their opalescent, colloidal nature. The new complex is an extremely active precipitant for its homologous antisera, forming a precipitate in solutions as dilute as 1:4,000,000, and even forming a precipitate with a homologous antiserum which has been absorbed completely with the acetylated polysaccharide of Avery and Goebel, above referred to.

In preparing this new product, the coccus culture, which is advantageously an autolyzed culture, is concentrated by freezing the culture and removing water from the frozen material by evaporation or sublimation while maintaining the material in a solid state. This dehydration or desiccation can be carried out until the culture is concentrated to about $\frac{1}{10}$ or $\frac{1}{15}$ of its original volume, or can be continued until the culture is obtained as a dry powder, which can then be dissolved in a small amount of water to form a concentrated solution. The concentrated material so obtained is neutralized, and subjected to successive extractions and precipitations, as will be described in detail hereinafter, for the isolation of the polysaccharide complex.

Cocci cultures, particularly autolyzed cultures of cocci, are distinctly acid, and it is my belief that in the processes which have been previously proposed for the extraction of soluble specific substances from cocci cultures, particularly the autolyzed cultures, the polysaccharide complexes are disrupted, broken or depolymerized by the process of concentration which has been used, which has involved the evaporation of water from the culture by heating the culture on a boiling water bath or a steam bath until the necessary reduction in volume has taken place. It is my belief that the exposure of the polysaccharide complex to the action of the acid at the temperature of the boiling water bath or steam bath, and the concentration of acid which takes place as the water is removed, is responsible for this disruption, which may be a hydrolysis or other disruption. This exposure of the polysaccharide complex to the action of the acid for prolonged periods and at relatively high temperatures and to oxidative processes which occur in the presence of air is, of course, avoided in my process, in which the material is solidly frozen, and is concentrated while in a frozen state; such that the various constituents present are maintained in a fixed relationship such that the acid cannot have any hydrolyzing or other destructive action on the complex.

In producing the polysaccharide complex of the various cocci, cultures, particularly autolyzed cultures, are used instead of the massed organisms. All cocci tend to autolyze more or less rapidly, and in growing these organisms, if they are kept in the culture medium for a sufficiently long time to allow a reasonable growth, a large proportion, or all of the cocci, become autolyzed, such that most of the soluble specific substances, particularly the polysaccharide complex with which this invention is concerned, become dispersed in the culture medium, so that the complex can be obtained from the culture medium, but not from the massed organisms. Bacilli, on the other hand, do not autolyze readily, so that the polysaccharide complex present in bacilli does not become dispersed throughout the culture medium, and the complex can be recovered from the massed organisms. It may be that this dispersion of the polysaccharide complex throughout the culture medium explains the failure of various workers to obtain such a complex from organisms of the coccus group, even though a similar product has been obtained from organisms of the bacillus group.

The process of the present invention is applicable to the production of polysaccharide complexes from all types of pathogenic cocci, and the present invention includes the isolated polysaccharide complexes from all of the pathogenic cocci, including the complexes from the following most important pathogenic cocci:

All types of pneumococcus (*Diplococcus pneumoniae*)
All types of meningococcus (*Neisseria intracellularis*)
Gonococcus (*Neisseria gonorrhea*)
Neisseria catarrhalis
Micrococcus melitensis
Staphylococcus aureus
Staphylococcus albus
Streptococcus scarlatinae
Streptococcus hemolyticus
Streptococcus pyogenes
Streptococcus viridans The invention will be further illustrated by the folowing description of the production of a polysaccharide complex from an autolyzed culture of pneumococcus Type I, and by a description of the properties of this particular polysaccharide complex, but it is not limited thereto, as it includes the production of the polysaccharide complexes from the various pathogenic cocci.

100 litres of meat infusion phosphate broth containing 0.3% dextrose broth are seeded with an actively growing culture of pneumococcus Type I and incubated at 37° C. for eight days. During this period of growth the bacterial cells undergo marked autolysis. The reaction of the culture fluid at the end of this period is distinctly acid. The autolyzed culture is transferred to 50 litre Allegheny metal balloon flasks, placing 12.5 litres into each of 8 such flasks. The culture is transformed from the liquid to the completely frozen solid state by the freezing of the liquid by indirect contact with a freezing agent such as dry ice (solid carbon dioxide) and methyl cellosolve or other low temperature refrigerant or freezing mixture. Preferably a freezing mixture at a temperature of about −70° C. is used.

To facilitate freezing, it is desirable to add the liquid culture to the balloon flasks in installments and to allow the material to freeze solidly in the form of layers on the inside of the flasks. When a layer of the culture is thus frozen to a temperature below the freezing point, the addition of a further amount of the material will result in its rapidly freezing by coming in contact with the already frozen layer of culture at a low temperature, and by the further cooling action of the refrigerant in contact with the outside of the container.

When the flasks or containers have become charged to the desired extent with the completely and solidly frozen culture, the charged flasks or containers are then connected to a condenser which is packed in or embedded in a suitable freezing mixture such as solid carbon dioxide and methyl cellosolve at a temperature of about −70° C. and which is also connected with a high vacuum pump, and the air is exhausted and a high vacuum maintained to effect sublimation or removal of the ice from the material in the flask or container at a temperature below that at which the material melts or becomes liquid. When the vacuum becomes sufficiently high, water vapor leaves the frozen culture, without melting the culture, and is collected in the form of ice in the condenser. In order to increase the rate of evaporation of the water in the frozen culture, the charged containers may be warmed with warm circulating air or by immersing them in a warm liquid, but the heat applied should not be sufficient to melt or even soften the frozen charge.

By maintaining a sufficiently high vacuum, and by regulating the heat input to the flasks containing the frozen culture such that the frozen material is kept solid and without melting, the ice contained in the frozen culture is sublimed and removed without converting the frozen culture into a liquid state and there remains, after the removal of the ice, a dry product which has been freed from water while in a completely frozen state.

As a result of this treatment of the culture, there is avoided or prevented any chemical changes, such as oxidation in the presence of air, or that produced by hydrolysis through the action of heat and acid, in the polysaccharide complex present in its natural state as a constituent of the bacterial cell, and as a result, there is obtained a product from which the undisrupted, undepolymerized polysaccharide complex may be extracted in pure form by suitable means.

To the resulting dry product sufficient water is added to bring the volume to approximately $\frac{1}{10}$ the original volume or about 10 litres. From this point on the process of extraction and purification of the polysaccharide complex is essentially the same as processes previously suggested.

The 10 litres of concentrated culture cooled to 0° C. is neutralized (to pH 7.0) while stirring with 96 grams of solid sodium bicarbonate, and 12 litres (1.2 volumes) of 95% ethyl alcohol are added to the concentrate, and, after standing for 18 hours at room temperature, the clear, amber supernatant liquid is syphoned off. The sediment is centrifuged with the formation of three layers, a top liquid layer, a yellowish solid middle layer, and a greyish solid bottom layer. The top liquid layer is discarded and the precipitate constituting the two lower layers is suspended in approximately 1600 cc. of water, forming a light brown turbid solution. This solution containing the pneumococcus polysaccharide is clarified by means of a Sharples centrifuge. The clear supernatant, about 2100 cc. is saved, and the sediment which collects in the centrifuge is washed with about 400 cc. of slightly acidulated water (N/100 acetic acid). This material is centrifuged, the supernatant (about 425 cc.) is saved and the residue is again washed with about 400 cc. of slightly acidulated water. This step of washing the sediment is repeated four times, or until the washings give a faint Molisch test. The original supernatant and the washings are combined, making a volume of about 4075 cc. To this solution is added 20.3 cc. of N/1 acetic acid and 203.7 grams of sodium acetate to buffer the solution. When this salt has dissolved completely, 4880 cc. (1.2 volumes) of 95% ethyl alcohol is added and the mixture is allowed to stand in the cold. The precipitate formed is recovered by centrifugation and suspended in 600 cc. of water, forming a strongly opalescent solution. This is clarified by means of a Sharples centrifuge; the supernatant is saved and the sediment washed with 250 cc. of water. To the combined cooled supernatant and washing (about 1865 cc.) are added 186 grams of solid trichloracetic acid and the solution is allowed to stand at 0° C. overnight. The heavy deposit of coagulated protein which precipitates from the solution is separated by centrifugation. The supernatant is saved and placed in the ice box. The sediment is suspended in 250 cc. water, cooled to 0° C., brought into solution by the cautious addition of 9 cc. of ice cold 2NNaOH (pH 6.4), and then is treated with 20 cc. of 50% trichloracetic acid. After standing 20 minutes, the coagulated protein is centrifuged and the supernatant saved and placed in the ice box. The coagulated protein is again suspended in water (100 cc.), cooled to 0° C., and brought into solution by the cautious addition of 2.5 cc. of ice cold 2NNaOH (pH 6.4), and then is treated with 12 cc. of a 50% trichloracetic acid solution. The coagulated protein is centrifuged and discarded, while the supernatant is saved. The three supernatants are combined (about 2200 cc.) and 88 grams of sodium acetate are added. The solution is cooled to 0° C. and to it are added 2640 cc. (1.2 volumes) of 95% ethyl alcohol. The polysaccharide complex precipitates as a white flocculent, gummy mass. The material is centrifuged, the supernatant is discarded, and the precipitate is dissolved in 1300 cc. of water. The solution is adjusted to pH 4.0 by the addition of 93 cc N/1HCl. After standing overnight in the cold, the solution is centrifuged, the precipitate discarded and the supernatant treated with 70 grams of sodium acetate and 1400 cc. (1 volume) 95% cold ethyl alcohol. The precipitate, which contains the specific polysaccharide complex, is recovered and dissolved in 350 cc. of water. The solution is opalescent and apparently colloidal. It is made definitely acid to Congo red by the addition of 70 cc. N/1HCl. The solution is then dialyzed for 8 days, or until the dialysate gives no test for the chlorine ion. The solution is centrifuged, the small amount of precipitate which separates out is discarded and the opalescent supernatant is poured into 10 vols. (5000 cc.) acidulated acetone (acetone containing 1% N/1HCl by volume). Water is removed from the rubbery or gummy precipitated specific polysaccharide complex by washing with 1000 cc. acetone, 500 cc. absolute alcohol, 500 cc. ether. 100 cc. absolute ether and drying in vacuo over $P_2O_5$. The yield from 100 litres of autolysed culture is about 4.5 grams. The product thus obtained is a pure white powder.

This polysaccharide complex of pneumococcus Type I, in the form of a white powder, is wet with difficulty by water, and when brought into contact with water, first swells and then gradually disperses to form a markedly opalescent colloidal solution. These aqueous solutions or dispersions of the product are highly viscous, a 0.25% solution or dispersion having, at 25° C. a viscosity of twice that of water. The dispersed particles are relatively large and sediment very quickly when a solution or dispersion of the product is subjected to ultra-centrifugal analysis. To carry out such an analysis, it is necessary to use a solution having a concentration of about 0.5% to obtain the necessary transparency. At this concentration, about 90% or more of the material in the solution or dispersion which absorbs ultra-violet light is in colloidal suspension, with relatively large particles which sediment very quickly, within about a minute after the start of the ultra-centrifuge. The opalescence of the solutions or dispersions is apparently caused by these large particles, although there is present in the solution or dispersion a small amount of material which absorbs ultra-violet light and which cannot be sedimented even at the highest field which I have found available for use in ultra-centrifugal analysis, namely, about 200,000 gravity.

The polysaccharide complex derived from the autolyzed culture of pneumococcus Type I as described above does not reduce Fehling's solution until it has been subjected to hydrolysis, as by means of a mineral acid, indicating that the complex contains no reducing sugars. It gives a positive naphthoresorcinol color test, indicating the presence of uronic acid. It gives no color reaction with iodine-potassium iodide solution, indicating that it contains no starch or dextrin. The Biuret, Millon, xanthoproteic and ninhydrin tests are negative with 2.0 cc. of a 0.5% solution, indicating that there is no protein, tyrosine or amino acid present in the complex. Neutral lead acetate precipitates an aqueous solution of the material.

A quantitative micro-analysis of the dried powder (dried in vacuum over $P_2O_5$), and of the acetylated polysaccharide of pneumococcus Type I, as previously known, shows the following:

|  | New polysaccharide complex, percent | Acetylated polysaccharide, percent |
|---|---|---|
| Carbon | 39.97 | 42.55 |
| Hydrogen | 5.85 | 6.58 |
| Nitrogen | 3.75 | 4.85 |
| Phosphorus | 0.40 | 0.00 |
| Amino nitrogen | 2.11 | 2.22 |
| Acetyl | 10.12 | 6.00 |
| Non-combustible residue | 2.82 | --- |
| Reducing sugars after hydrolysis | 20.00 | 32.00 |

The most striking differences between the new complex and the acetylated polysaccharide are the presence of phosphorus in the new complex and the radically higher acetyl content of the new complex. This difference in acetyl content clearly shows that the acetylated polysaccharide previously known has been at least partially depolymerized during isolation, probably during the concentration of the culture. The significance of the presence of phosphorus in the new complex is not yet fully understood, although it may indicate the presence of lipoid residues of the nature of lecithin.

The new polysaccharide complex is quite resistant to hydrolysis, as shown by the following tests:

1. A portion of the complex was dissolved in N/5 acetic acid, and heated on a water bath under reflux conditions for 3¼ hours. At the end of this period, the solution still had some opalescence. Finely divided greyish particles floated in the solution.

2. A portion of the complex was dissolved in normal hydrochloric acid and heated on a water bath for one hour, using a reflux condenser. The opalescence of the solution disappeared, and the solution turned yellow. On cooling the flask, grayish white particles floated in the solution. On shaking the solution with ether, the particles disappeared, apparently being soluble in ether. The aqueous fraction was recovered, heated to drive off traces of ether and neutralized with normal caustic soda solution. A portion of the solution was tested for reducing sugars quantitatively, and reducing sugars, expressed as dextrose, corresponding to 4.4% of the polysaccharide complex were found.

3. Another portion of the complex was placed in a test tube, and 1.5 normal hydrochloric acid was added. The tube was flame-sealed, and heated in an oven at 110° C. for four hours, after which it was removed from the oven, cooled, and the contents neutralized with normal caustic soda solution. A test for reducing sugars indicated the presence of these substances in an amount corresponding to 20% of the original complex, expressed as glucose.

The polysaccharide complex is a highly active precipitant for its homologous Type I anti-pneumococcus serum, reacting in solutions up to 1:4,000,000. The new complex reacts with its homologous immune horse serum even after such serum has been treated with an excess of the acetylated polysaccharide which has been heretofore considered an active precipitant; whereas the same acetyl polysaccharide does not react with its homologous immune horse serum which has been treated with the polysaccharide complex produced in accordance with the present invention. The comparative reactivity of the acetylated polysaccharides previously produced, and the new polysaccharide complex, are shown in the following table, in which are tabulated the results of treating Type I anti-pneumococcus serum with the homologous polysaccharide complex, and the homologous acetylated polysaccharide, in various dilutions, both without previous treatment of the serum, and after absorption (treatment) of the serum with an excess of the new polysaccharide complex and an excess of the acetylated polysaccharide:

| | Anti-pneumococcic serum, Type I | | |
|---|---|---|---|
| | Unabsorbed | Absorbed with excess of acetylated polysaccharide | Absorbed with excess of new complex |
| *New complex* | | | |
| 1:20,000 | ++++ | ++++ | − |
| 1:100,000 | ++++ | ++++ | − |
| 1:500,000 | ++++ | +++ | − |
| 1:1,000,000 | ++++ | ++ | − |
| 1:2,000,000 | ++ | + | − |
| 1:3,000,000 | ++ | − | − |
| *Acetylated polysaccharide* | | | |
| 1:20,000 | ++++ | − | − |
| 1:100,000 | ++++ | − | − |
| 1:500,000 | +++ | − | − |
| 1:1,000,000 | + | − | − |
| 1:2,000,000 | + | − | − |
| 1:3,000,000 | − | − | − |

++++ = Precipitate formed as a disc.
+++ = Heavy precipitate, no disc.
++ = Precipitate.
+ = Turbid.
− = No precipitate or turbidity.

The new polysaccharide complex derived from a culture of pneumococcus Type I as described above is capable of producing active immunity in mice. Mice were injected intraperitoneally with 1 cc. of various dilutions of the polysaccharide complex, using dilutions up to 1:25,000,000, and after 8 days they were injected with varying amounts of a 5 hour virulent culture of pneumococcus Type I. Mice which had received 1 cc. of the 1:25,000,000 solution of the polysaccharide complex survived the injection of 10,000 to 50,000 minimum lethal doses of the virulent pneumococci.

While the present invention has been described in detail with reference to the production of a new polysaccharide complex having active antigenic properties from pneumococcus Type I, and by a detailed description of the properties of this particular complex, it is equally applicable to the production of corresponding polysaccharide complexes from cultures, particularly autolyzed cultures, of other cocci, including other types of pneumococci, and the polysaccharide complexes so produced from other types of cocci have corresponding properties.

I claim:

1. In the production of polysaccharide complexes from cultures of cocci, the improvement which comprises concentrating the culture by freezing and removing water from the frozen material by the application of a high vacuum while maintaining the material solid, and isolating the polysaccharide complex from the concentrated culture by selective extractions and precipitations.

2. In the process of preparing polysaccharide complexes from cultures of cocci, the improvement which comprises producing an autolyzed culture, freezing said culture to a solid frozen state, and removing water from said frozen material by the application of a high vacuum while maintaining the material frozen and solid, continuing the removal of water until a dry product is obtained, and adding to such dry product an amount of water less than that removed, thereby producing a concentrated culture, and isolating the polysaccharide complex from the concentrated culture by selective extractions and precipitations.

3. In the process of preparing polysaccharide complexes from cultures of cocci, the steps which comprise freezing the culture to a solid frozen state, removing water from the frozen material by the application of a high vacuum while maintaining the material frozen and solid, and continuing the application of the vacuum until sufficient water is removed so that when the product is melted a concentrated product is obtained, and isolating the polysaccharide complex from the concentrated culture by selective extractions and precipitations.

4. Products produced by the process of claim 1, said products, when in the form of powders, swelling on contact with water, and then dispersing to form opalescent solutions, said products having the properties of forming precipitates with homologous antisera in vitro, and of producing active immunity in animals.

5. Active polysaccharide complexes derived from pneumococci by the process of claim 1, said products, when in the form of powders, swelling on contact with water, and then dispersing to form opalescent solutions, said products having the properties of forming precipitates with homologous antisera in vitro, and of producing active immunity in animals.

PETER MASUCCI.

CERTIFICATE OF CORRECTION.

Patent No. 2,166,963. July 25, 1939.

PETER MASUCCI.

It is hereby certified that error appears in the printed specification of the above numbered patent requiring correction as follows: Page 2, first column, line 2, for the word "liability" read lability; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.

a culture of pneumococcus Type I as described above is capable of producing active immunity in mice. Mice were injected intraperitoneally with 1 cc. of various dilutions of the polysaccharide complex, using dilutions up to 1:25,000,000, and after 8 days they were injected with varying amounts of a 5 hour virulent culture of pneumococcus Type I. Mice which had received 1 cc. of the 1:25,000,000 solution of the polysaccharide complex survived the injection of 10,000 to 50,000 minimum lethal doses of the virulent pneumococci.

While the present invention has been described in detail with reference to the production of a new polysaccharide complex having active antigenic properties from pneumococcus Type I, and by a detailed description of the properties of this particular complex, it is equally applicable to the production of corresponding polysaccharide complexes from cultures, particularly autolyzed cultures, of other cocci, including other types of pneumococci, and the polysaccharide complexes so produced from other types of cocci have corresponding properties.

I claim:

1. In the production of polysaccharide complexes from cultures of cocci, the improvement which comprises concentrating the culture by freezing and removing water from the frozen material by the application of a high vacuum while maintaining the material solid, and isolating the polysaccharide complex from the concentrated culture by selective extractions and precipitations.

2. In the process of preparing polysaccharide complexes from cultures of cocci, the improvement which comprises producing an autolyzed culture, freezing said culture to a solid frozen state, and removing water from said frozen material by the application of a high vacuum while maintaining the material frozen and solid, continuing the removal of water until a dry product is obtained, and adding to such dry product an amount of water less than that removed, thereby producing a concentrated culture, and isolating the polysaccharide complex from the concentrated culture by selective extractions and precipitations.

3. In the process of preparing polysaccharide complexes from cultures of cocci, the steps which comprise freezing the culture to a solid frozen state, removing water from the frozen material by the application of a high vacuum while maintaining the material frozen and solid, and continuing the application of the vacuum until sufficient water is removed so that when the product is melted a concentrated product is obtained, and isolating the polysaccharide complex from the concentrated culture by selective extractions and precipitations.

4. Products produced by the process of claim 1, said products, when in the form of powders, swelling on contact with water, and then dispersing to form opalescent solutions, said products having the properties of forming precipitates with homologous antisera in vitro, and of producing active immunity in animals.

5. Active polysaccharide complexes derived from pneumococci by the process of claim 1, said products, when in the form of powders, swelling on contact with water, and then dispersing to form opalescent solutions, said products having the properties of forming precipitates with homologous antisera in vitro, and of producing active immunity in animals.

PETER MASUCCI.

CERTIFICATE OF CORRECTION.

Patent No. 2,166,963. July 25, 1939.

PETER MASUCCI.

It is hereby certified that error appears in the printed specification of the above numbered patent requiring correction as follows: Page 2, first column, line 2, for the word "liability" read lability; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.